US012686448B2

(12) United States Patent

Herrmann et al.

(10) Patent No.: US 12,686,448 B2

(45) Date of Patent: Jul. 21, 2026

(54) AIR GUIDING DEVICE OF A MOTOR VEHICLE BODY WITH A FLEXIBLE AIR GUIDING ELEMENT

(71) Applicant: Dr. Ing. h.c. F. Porsche Aktiengesellschaft, Stuttgart (DE)

(72) Inventors: Bernd Herrmann, Ehningen (DE); Riccardo Bauer, Owen (DE); Stefan Rudersdorf, Santa Clara, CA (US)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 292 days.

(21) Appl. No.: 18/588,043

(22) Filed: Feb. 27, 2024

(65) Prior Publication Data

US 2024/0336309 A1     Oct. 10, 2024

(30) Foreign Application Priority Data

Apr. 4, 2023    (DE) .......................... 102023108536.0

(51) Int. Cl.
    *B62D 35/00*        (2006.01)
(52) U.S. Cl.
    CPC .................................. *B62D 35/007* (2013.01)
(58) Field of Classification Search
    CPC .............................. B62D 35/007; B62D 37/02
    USPC ....................................................... 296/1.01
    See application file for complete search history.

(56) References Cited

U.S. PATENT DOCUMENTS

| | | | | |
|---|---|---|---|---|
| 5,923,245 A | * | 7/1999 | Klatt .................... | B60Q 1/2692 |
| | | | | 296/180.1 |
| 7,150,494 B2 | * | 12/2006 | Bangle .................... | B32B 5/026 |
| | | | | 296/180.5 |
| 11,673,618 B2 | * | 6/2023 | Moradnia .............. | B62D 37/02 |
| | | | | 296/180.1 |
| 2004/0130182 A1 | | 7/2004 | Bangle et al. | |
| 2007/0063541 A1 | | 3/2007 | Browne et al. | |
| 2007/0216194 A1 | | 9/2007 | Rober et al. | |
| 2011/0224846 A1 | | 9/2011 | Simon | |
| 2018/0141595 A1 | | 5/2018 | Herrmann et al. | |

FOREIGN PATENT DOCUMENTS

| | | |
|---|---|---|
| DE | 112006002539 T5 | 7/2008 |
| DE | 112006002692 B4 | 2/2014 |
| DE | 102018130327 A1 | 6/2020 |
| WO | 02051688 A2 | 7/2002 |

* cited by examiner

*Primary Examiner* — Steven O Douglas

(74) *Attorney, Agent, or Firm* — Buchanan Ingersoll & Rooney PC

(57) ABSTRACT

An air guiding device of a motor vehicle body having a flexible air guiding element, wherein the air guiding element includes a frame, in whose interior a flexible active element, is arranged. The flexible active element is configured so that its geometry can be changed under the action of a pulling force (F), wherein at least one pulling element is configured on the active element, on which the pulling force (F) can act with the aid of a kinematic system of the air guiding device.

12 Claims, 4 Drawing Sheets

AIR GUIDING DEVICE OF A MOTOR VEHICLE BODY WITH A FLEXIBLE AIR GUIDING ELEMENT

CROSS-REFERENCE TO RELATED APPLICATION

This application claims priority to German Patent Application No. 10 2023 108 536.0, filed Apr. 4, 2023, the content of such application being incorporated by reference herein in its entirety.

FIELD OF THE INVENTION

The invention relates to an air guiding device of a motor vehicle body with a flexible air guiding element.

BACKGROUND OF THE INVENTION

Air guiding devices comprising air guiding elements for motor vehicle bodies of motor vehicles are known. The air guiding elements are in particular so-called rear wings or rear spoilers that are movably received on the motor vehicle body so that they can assume different positions relative to the motor vehicle body between a first end position and a second end position. In particular, the rear wing can be used to vary the downforce of the motor vehicle comprising the motor vehicle body during operation.

The air guiding element may have a fixed or flexible design. The advantage of a flexible air guiding element is an increased variability over an operating range of the adjustment of an outer contour of the air guiding element to bring about the necessary downforce. In other words, a geometry of the air guiding element, which is configured to guide the air flow, can often be changed.

Publications DE 10 2018 130 327 A1 and DE 11 2006 002 539 T5, which are incorporated by reference herein, as well as the patent specification DE 11 2006 002 692 B4, which is incorporated by reference herein, disclose a body element with a flexible air guiding element, wherein an outer contour of the air guiding element can be changed with the aid of an adjustment device comprising a rotatable cam.

Likewise, publication WO 2002/051688 A2, which is incorporated by reference herein, shows an air guiding element configured in the rear region of a motor vehicle body, which has a flexible design, wherein its outer contour can be varied with the aid of a rotatable adjustment element, in particular in the form of a cam.

SUMMARY OF THE INVENTION

An air guiding device according to aspects of the invention for a motor vehicle body having a flexible air guiding element, wherein the air guiding element comprises a frame in the interior of which a flexible active element is arranged, according to aspects of the invention the flexible active element is configured so that its geometry can be changed under the action of a pulling force, wherein at least one pulling element is arranged on the active element, on which the pulling force can act with the aid of a kinematic system of the air guiding device. The advantage of the invention is that a maximum variation of the geometry of the active element can be brought about.

In a configuration of the air guiding device according to aspects of the invention, the frame comprises four frame elements, which form the interior, wherein at least two of the frame elements are configured to be changeable. In particular, the frame elements, which extend along a body longitudinal axis of the motor vehicle body, are configured to be changeable. The advantage is that a geometry of the frame elements can be adjusted to a desired geometry of the active element to bring about an optimized downforce.

To effectively change the geometry of the air guiding element, the active element has a textile-like design. That means that, due to a textile-like nature of the active element, a maximum possible variability of the geometry of the air guiding element is given.

To stabilize the active element, or in other words to stabilize a desired geometry of the active element, at least one support element extending along a body transverse axis is operatively connected to the active element. As the support element extends along the body transverse axis, this results in a dimensional stability or geometric stability along the body transverse axis to achieve the desired downforce realized with the aid of the air guiding element.

If the pulling element is tab-like in design, there is the option of simply arranging a support element for stabilizing the active element in the pulling element.

Advantageously, the frame is configured at least partially raiseable or lowerable with the aid of a guide arm.

If the active element can cover a cavity configured between the active element and an underbody of the air guiding element, a kinematic system arranged in the cavity and/or its controller can be protected from contamination, for example.

A preferred tensioning of the active element can be achieved in any position of the active element and under any application of force to the active element, provided that the active element comprises a first element edge extending along the body transverse axis and a second element edge formed facing away from the first element edge, which also extends along the body transverse axis, wherein one of the two element edges is fixedly connected to the frame and the other of the two element edges is fixedly received in a tensioning element formed independently of the frame. This means that an element edge is fixedly tensioned along the body transverse axis while the element edge facing away from it can be moved with the aid of the tensioning element. Particularly preferably, the tensioning element is rotatable about its axis of rotation. This makes it easy to roll up a resulting excess of the active element in a particular position of the air guiding element along the body longitudinal axis. This means that the desired tension of the active element can be brought about, in particular along the longitudinal body axis. Preferably, the tensioning element is configured to be spring-loaded.

BRIEF DESCRIPTION OF THE DRAWINGS

Additional advantages, features, and details of the invention arise from the following description of preferred example embodiments, as well as with reference to the drawings. The features and feature combinations specified hereinabove in the description, as well as the features and feature combinations mentioned hereinafter in the description of the drawings and/or shown alone in the drawings, can be used not only in the respectively specified combination, but also in other combinations, or on their own, without departing from the scope of the invention. Identical or functionally identical elements are assigned identical reference signs.

The figures show.

DETAILED DESCRIPTION OF THE INVENTION

Figure 1:
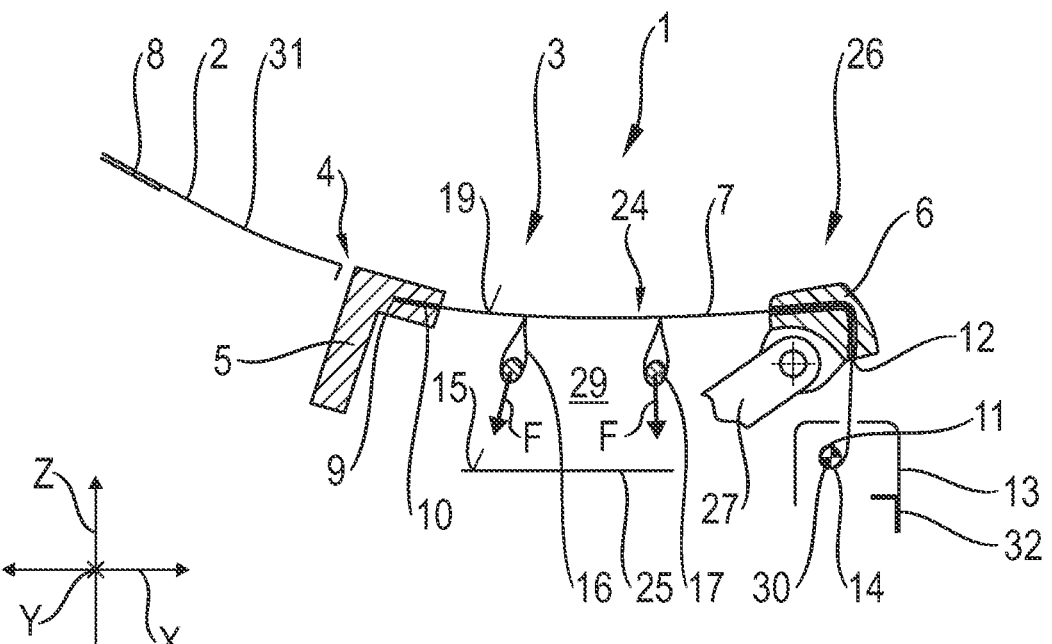
FIG. 1 in a longitudinal section along a body longitudinal axis, a rear region of a motor vehicle body with an air guiding device according to aspects of the invention in a first example embodiment, FIG. 2 in a perspective view, a cut-out view of the air guiding device according to FIG. 1, FIG. 3 in a top plan view, a rear region of the motor vehicle body with the air guiding device according to aspects of the invention in accordance with FIG. 1, FIG. 4 in a longitudinal section along the body longitudinal axis, the rear region of the motor vehicle body with the air guiding device according to aspects of the invention in a second example embodiment in a first position, FIG. 5 in a longitudinal section along the body longitudinal axis, the rear region of the motor vehicle body with the air guiding device according to aspects of the invention according to the second example embodiment in a second position, and FIG. 6 in a top plan view, a rear region of the motor vehicle body with the air guiding device according to aspects of the invention in accordance with FIG. 4.

In FIG. 1, in a longitudinal section along a body longitudinal axis X, a rear region 1 of a motor vehicle body 2 with an air guiding device 3 according to aspects of the invention is depicted in a first example embodiment. To provide a clearer explanation, a Cartesian coordinate system is introduced, which identifies the body longitudinal axis X, a body transverse axis Y of the motor vehicle body 2 and a body vertical axis Z of the motor vehicle body 2.

The air guiding device 3 is configured in the form of a rear spoiler arranged in the rear region 1. It comprises a frame 4, which comprises a first frame element 5 extending along the body transverse axis Y and a second frame element 6 opposite the first frame element 5. Between the first frame element 5 and the second frame element 6, an elastic, or in other words flexible, active element 7 of the air guiding device 3 is arranged. That is to say, that the term elastic or flexible can be understood to mean that the geometry of an active element is changeable.

The first frame element 5, which is arranged facing towards a rear window 8 received in a rear frame 31 of the motor vehicle body 2, is the elastic active element 7 configured to be fixedly received. That is to say, in other words, the active element 7 is unmovably connected to the first frame element 5. For example, its first element edge 9, which faces the first frame element 5, is inserted into a receiving slot 10 of the first frame element 5 and fixedly connected to the first frame element 5, for example with the aid of a materially locking and/or form-fit connection.

Its second element edge 11, which faces away from the first element edge 9, is configured to extend through the second frame element 6, wherein the second frame element 6 comprises a receiving opening 12 for this purpose, through which the active element 7 can be guided with its second element edge 11.

The second element edge 11 is received in an opposite body component 13 of the motor vehicle body 2. There, it can be fixedly connected to the body component 13, which can be designed, for example, to receive a light strip 32, or it can be fixedly connected to a rotatable tensioning element 14, as shown in FIG. 1. The tensioning element 14 is configured to be rotatable about its element axis 30 so that the active element 7 can be wound or unwound around the tensioning element 14. This means that the active element 7 is spanned between the first frame element 5 and the body component 13, deflected by the second frame element 6.

Thus, the active element 7 of the first example embodiment has the first element edge 9 extending along the body transverse axis Y fixedly connected to the frame 4, and the second element edge 11 formed facing away from the first element edge 9 and also extends along the body transverse axis Y, is fixedly received in the tensioning element 14 formed independently of the frame 4.

Between the first frame element 5 and the second frame element 6, the active element 7 comprises pulling elements 16, which are configured in the form of pull tabs, facing an underbody 25 of the air guiding device 3. Or in other words, the pulling element 16 is tab-like. The pulling element 16 in the form of a pull tab offers the advantage that a rigid support element 17 for stabilizing a geometry of the active element 7 can be easily received in it.

Figure 2:
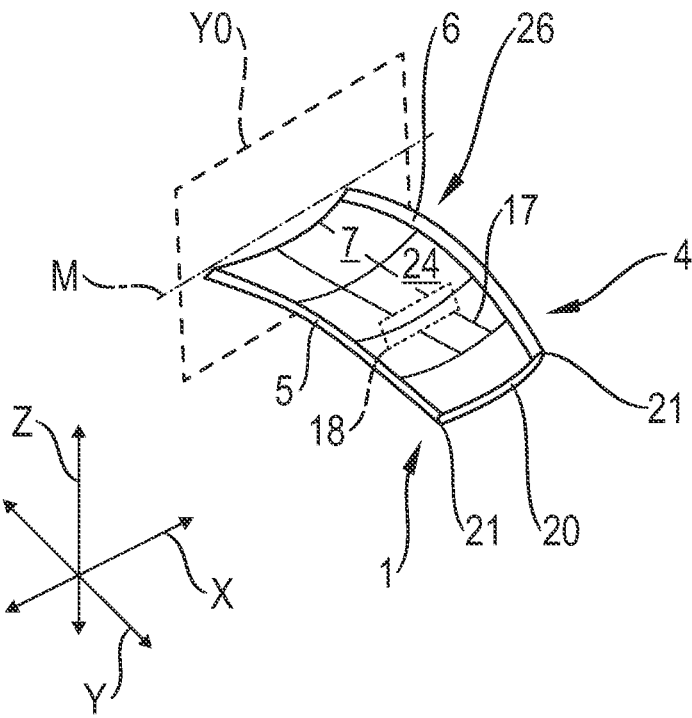

As illustrated in FIG. 2, the support elements 17 are arranged adjacent to each other along the body longitudinal axis X extending along the body transverse axis Y. Or in other words, the support elements 17, which may also be referred to as the guides, are arranged in parallel with the network.

The pulling elements 16, which are designed to receive the support elements 17, are connected to a kinematic system 18, with the aid of which tension can be applied on them to bring about a desired effective surface 19 of the active element 7. That is to say, in other words, a pulling force F may act on the pulling elements 16. Thus, the flexible active element 7, and also its active surface 19, is configured so that its geometry can be changed under the action of the pulling force, wherein at least one pulling element 16 is configured on the active element 7, on which the pulling force F can act with the aid of kinematic system 18.

Figure 3:
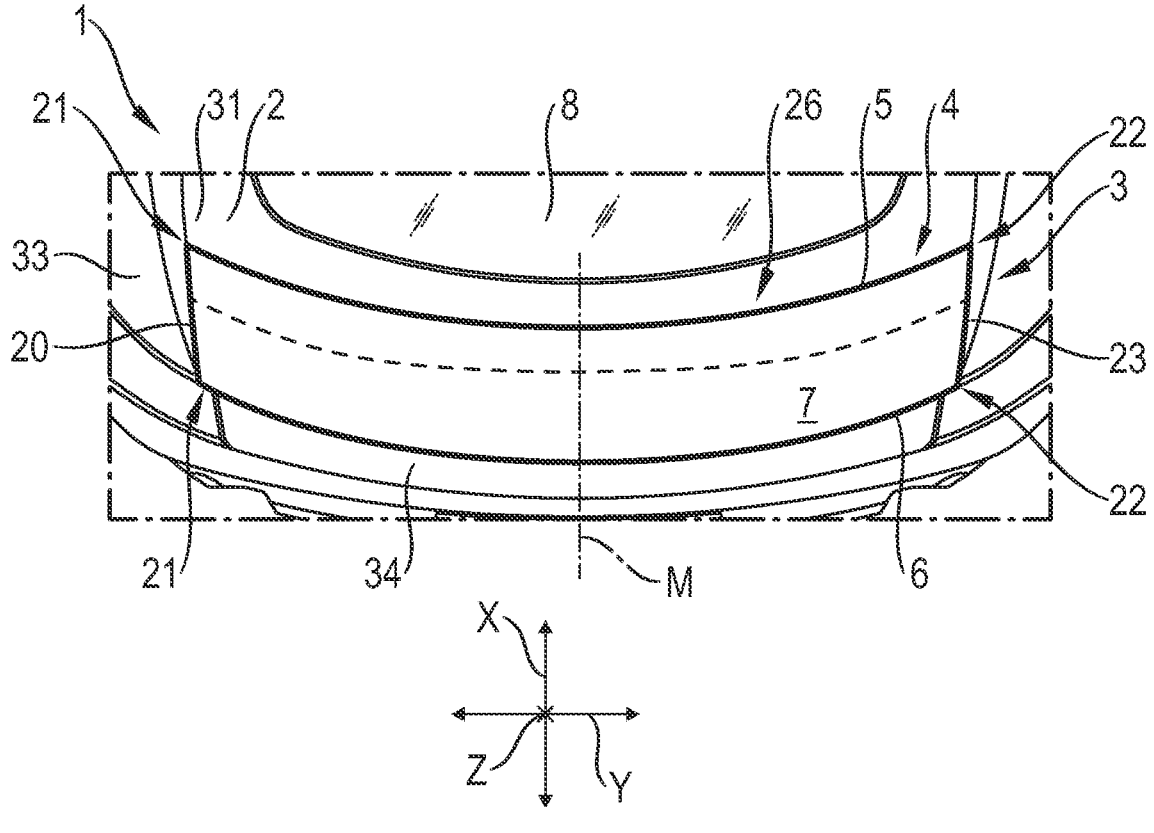

In FIG. 2, the air guiding device 3 is shown bisected along a sectional plane Y0 that spans along the body longitudinal axis X and the body vertical axis Z, wherein it is mirror-symmetrical to the sectional plane Y0. The first frame element 5 and the second frame element 6 are connected to each other by means of a third frame element 20 of the frame 4 at their respective first element end 21. Furthermore, as illustrated in FIG. 3, where the rear region 1 is shown here in a plan view, they are connected to each other at their second element end 22, which is formed facing away from the first element end 21, by means of a fourth frame element 23 of the frame 4, forming the frame 4. The flexible active element 7 of the air guiding device 3 is received within the frame 4, i.e., in an interior 24 of the frame 4. The third frame element 20 and the fourth frame element 23 are thus configured to extend along the body axis X.

At this point, it should be noted that the frame 4, the active element 7 and the underbody 25 having a bottom surface 15 form an air guiding element 26 of the air guiding device 3, or in other words, the rear spoiler.

As shown in FIG. 2, the active element 7 is curved downwards starting from a central axis M lying in the sectional plane Y0 in the direction of the third frame element 20, or the fourth frame element 23.

The first frame element 5 is fixedly arranged in the motor vehicle body 2, thus rigidly connected thereto. The second frame element 6 is configured movably, wherein it can be lifted or lowered along the body vertical axis Z, as is the case with rear spoilers known from the prior art. This is realized with the aid of a guide arm 27 receiving the second frame element 6, wherein the second frame element 6 is connected to the guide arm 27 in a frictionally locking and/or form-fit manner, in particular with the aid of a screw connection. That is to say, the guide arm 27 is pivotable about a rotational axis, which is not shown in greater detail, and thus moves it with the aid of the fixed connection to the second frame element 6. The frame 4 can thus be at least partially raised or lowered with the aid of the guide arm 27.

The elastic active element 7, which has a textile-like design, in particular made of a textile material, can form numerous different geometries of the active surface 19 with the aid of the pulling elements 16. In order for the third frame element 20 and the fourth frame element 23 to be able to adapt to the respective set geometry of the active surface 19, so that no gap is created between the frame 4 and the active element 7, the third frame element 20 and the fourth frame element 23 are configured to be changeable, for example, and are made of an elastic material, or are configured in the form of a chain with chain links that can be moved relative to one another.

The different geometries of the active surface 19 can be further varied by the support elements 17 being not integrally formed from the third frame element 20 to the fourth frame element 23 but rather divided into support element parts 28, wherein a pulling element 16 is preferably assigned to each support element part 28.

The second frame element 6 is designed to be unchangeable but, as already explained, movable and adapted to a desired frame shape of the frame 4. The active element 7 spanned in the interior of the frame 4 can adapt to the rigid second frame element 6, in particular because it is guided through the receiving opening 12 and is preferably spring-loaded at its second element edge 11.

In an example embodiment, which is not shown in more detail, the second frame element 6 does not comprise a receiving opening 12, but rather the active element 7 is guided over the second frame element 6. Or in other words, the convex curvature of the second frame element 6 shown in FIG. 3 may be spanned.

Regardless of whether the second frame element 6 comprises a receiving opening 12, or the active element 7 is guided over the second frame element 6, an advantage of receiving the second element edge 11 in the tensioning element 14 configured independently of the frame 4 is that a cavity 29 configured between the underbody 25 and the active element 7, in which the pulling elements 16 and the kinematic system 18 are arranged, for example, cannot be seen from the outside. It is thus covered. Or in other words, the active element 7 can cover the cavity 29.

Figure 4:
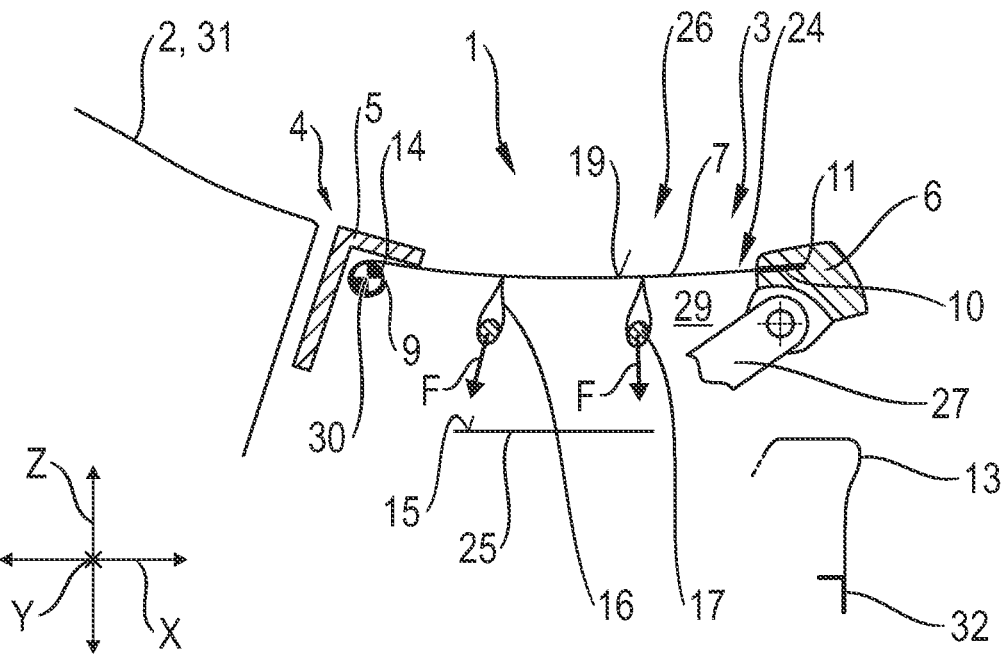
Figure 6:
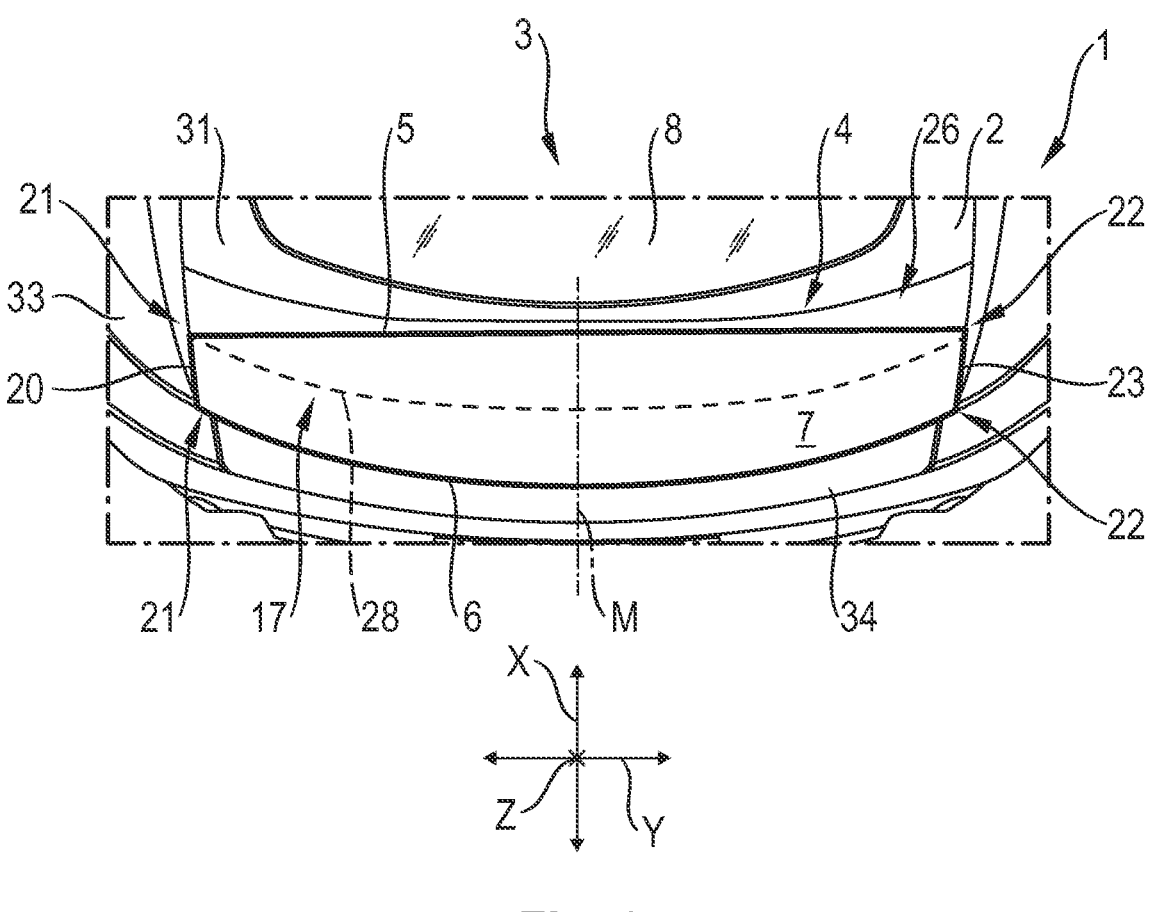

FIGS. 4 and 6 illustrate the air guiding device 3 according to aspects of the invention in a second example embodiment. The air guiding device 3 of the second example embodiment differs from the air guiding device 3 of the first example embodiment in that the first element edge 9 can be rolled up and the second element edge 11 is fixedly connected to the second frame element 6. For this purpose, the second frame element 6 comprises the receiving slot 10. Thus, the active element 7 of the second example embodiment comprises the first element edge 9 extending along the body transverse axis Y, fixedly received in the tensioning element 14, which is formed independently of the frame 4, and the second element edge 11 configured facing away from the first element edge 9, which also extends along the body transverse axis Y, is fixedly connected to frame 4.

Figure 5:
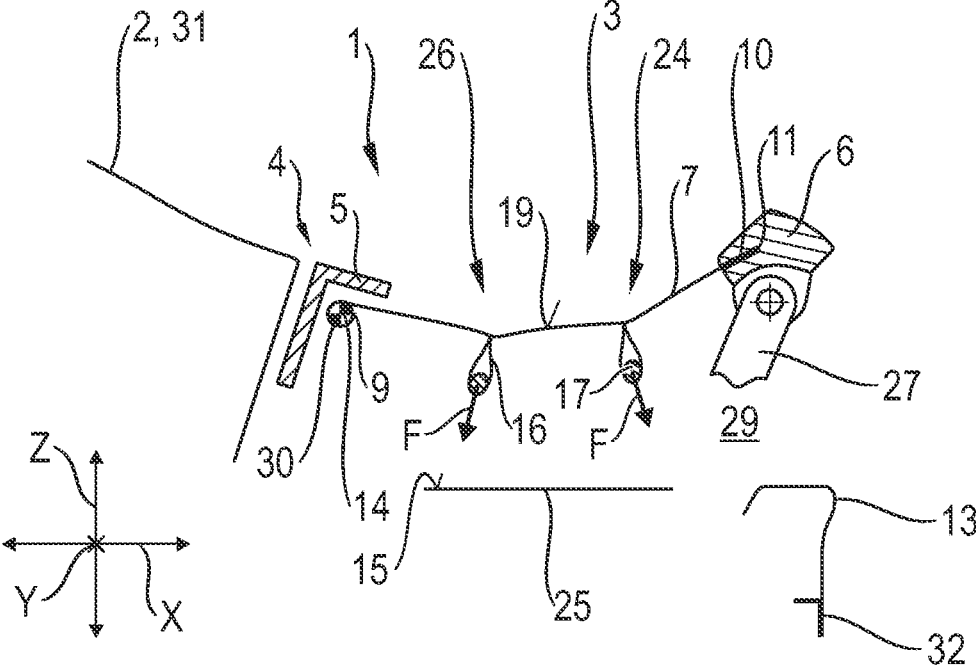

In FIG. 4, the air guiding element 26 is depicted in a first position. A second position of the air guiding element 26, which differs from the first position due to an adjustment of the second frame element 6 and other pulling forces on the active element 7, a so-called "performance" position, is illustrated in FIG. 5.

The preferably spring-loaded, in particular rotational spring-loaded tensioning element 14, which can be rotated about its element axis 30, is fixedly connected to the first element edge 9. The tensioning element 14 is rotatably received in the first frame element 5 about its element axis 30. Since the second element edge 11 is fixedly connected to the second frame element 6, the cavity 29 can either be seen or closed with a cover element not shown in more detail.

The frame 4 may be configured to form a joint, or it may be received in a rear cover configured between side portions 33 of the motor vehicle body 2, a rear portion 34 of the motor vehicle body 2, and the rear frame 31, which is not shown in more detail.

LIST OF REFERENCE NUMBERS

1 Rear region
2 Motor vehicle body
3 Air guiding device
4 Frame
5 First frame element
6 Second frame element
7 Active element
8 Rear window
9 First element edge
10 Receiving slot
11 Second element edge
12 Receiving opening
13 Body component
14 Tensioning element
15 Bottom surface
16 Pulling element
17 Support element
18 Kinematic system
19 Active surface
20 Third frame element
21 First element end
22 Second element end
23 Fourth frame element
24 Interior
25 Underbody
26 Air guiding element
27 Guide arm
28 Support element part
29 Cavity
30 Element axis
31 Rear frame
32 Light strip
33 Side portion
34 Rear portion
F Pulling force
M Center axis
X Body longitudinal axis
Y Body transverse axis
Y0 Sectional plane
Z Body vertical axis

What is claimed is:
1. An air guiding device for a motor vehicle body, said air guiding device comprising:
   a flexible air guiding element having a moveable frame and a flexible active element extending across an interior of the frame, wherein a geometry of the flexible active element is configured to be changed under the action of a pulling force that is applied onto an underside of the flexible active element, and at least one pulling element fixed to the flexible active element at a location within the interior of the frame, wherein applying the pulling force onto the pulling element changes a position of the frame and the geometry of the flexible active element.

2. The air guiding device according to claim 1, wherein the frame comprises four frame elements, which form the interior, wherein at least two of the frame elements are configured to be changeable.

3. The air guiding device according to claim 2, wherein the frame elements, which extend along a body longitudinal axis (X) of the motor vehicle body, are configured to be changeable.

4. The air guiding device according to claim 1, wherein the active element has a textile design, and wherein the active element remains extended across the interior of the frame in every position of the frame.

5. The air guiding device according to claim 1, wherein at least one support element extending along a body transverse axis (Y) is operatively connected to the active element to stabilize the active element.

6. The air guiding device according to claim 1, wherein the pulling element is a tab.

7. The air guiding device according to claim 1, further comprising a guide arm for raising and lowering the frame.

8. The air guiding device according to claim 1, wherein the active element is configured to cover a cavity located between the active element and an underbody of the air guiding element.

9. The air guiding device according to claim 1, wherein the active element comprises a first element edge extending along the body transverse axis (Y) and a second element edge, which is formed facing away from the first element edge, which also extends along the body transverse axis (Y), wherein one of the two element edges is fixedly connected to the frame and the other of the two element edges is fixedly received in a tensioning element formed independently of the frame.

10. The air guiding device according to claim 9, wherein the tensioning element is configured to be spring-loaded.

11. A motor vehicle body comprising the air guiding device of claim 1.

12. A motor vehicle comprising the motor vehicle body of claim 11.

* * * * *